United States Patent
Kyrtsos

(10) Patent No.: US 6,225,894 B1
(45) Date of Patent: May 1, 2001

(54) ROLL-OVER DETECTOR FOR VEHICLES

(75) Inventor: Christos T. Kyrtsos, Southfield, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/160,079

(22) Filed: Sep. 24, 1998

(51) Int. Cl.7 .................................................. B60Q 1/00
(52) U.S. Cl. ..................... 340/440; 340/441; 340/438; 180/282
(58) Field of Search ...................... 340/440, 441, 340/439, 438, 425.5; 180/282

(56) References Cited

U.S. PATENT DOCUMENTS

| | | | |
|---|---|---|---|
| 3,899,028 | * 8/1975 | Morris et al. | 172/4.5 |
| 3,994,352 | * 11/1976 | Siorek | 180/9.2 R |
| 5,032,821 | * 7/1991 | Domanico et al. | 340/440 |
| 5,226,675 | * 7/1993 | Noah et al. | 280/439 |
| 5,383,680 | * 1/1995 | Bock et al. | 280/714 |
| 5,563,575 | * 10/1996 | Yamamura et al. | 340/429 |
| 5,610,575 | 3/1997 | Gioutsos | 340/429 |
| 5,727,900 | * 3/1998 | Sandstrom | 404/84.1 |
| 5,808,197 | * 9/1998 | Dao | 73/514.09 |
| 5,890,084 | * 3/1999 | Halasz et al. | 701/45 |
| 5,939,626 | * 8/1999 | Tominaga et al. | 340/444 |

* cited by examiner

Primary Examiner—Jeffery Hofsass
Assistant Examiner—Sihong Huang
(74) Attorney, Agent, or Firm—Carlson, Gaskey & Olds

(57) ABSTRACT

A roll-over detector for vehicles includes a first accelerometer mounted on a first axle of the vehicle, a second accelerometer mounted on a second axle of the vehicle, and a third accelerometer mounted on a third axle of the vehicle. A controller compares data received from the first and second accelerometers and actuates a safety device to prevent a roll-over condition if the differences between the data exceed a predetermined value. The controller utilizes data from the third accelerometer to account for the effect of road conditions on the variations between the data from the first and second accelerometers.

14 Claims, 2 Drawing Sheets

ROLL-OVER DETECTOR FOR VEHICLES

BACKGROUND OF THE INVENTION

This invention relates to a method and apparatus for detecting a roll-over condition of a vehicle by analyzing forces acting on the vehicle.

Commercial trucks are an extremely popular way to transport freight, since it is versatile and inexpensive compared to other modes of transportation. Commercial trucks typically include a cab which hauls one or more cargo trailers. One safety issue relating to these types of trucks is the risk of roll-over of the vehicle which places the safety of the driver of the truck and of other adjacent vehicles at risk.

A roll-over condition typically occurs because a vehicle takes a turn at excessive speed or loses traction along the turn. The roll-over generally begins at the rear trailer of the vehicle as the rearmost wheels begin to tilt relative to the road surface. Unfortunately, by the time this effect progresses to the cab of the vehicle and is noticeable to the driver, the tilt of the rear trailer has drastically increased. At this point, it is usually too late to take corrective measures such as slowing the vehicle to prevent the roll-over from taking place.

One method to detect a roll-over condition is to mount a single accelerometer on the vehicle to measure the gravitational forces acting on the vehicle. Accelerometers measure forces in a single direction, and the accelerometer is mounted on the vehicle to measure the full force of gravity when the vehicle is upright. As the vehicle begins to tip, the readings from the accelerometer will decrease because the gravitational forces are no longer acting in the same direction relative to the accelerometer. When the measurements from the accelerometer decrease below a threshold value, a warning signal can be actuated to alert the driver of a roll-over condition.

The method described above has several disadvantages. First of all, during operation of the vehicle the readings from the accelerometer will fluctuate due to bumps and other variations in the road surface. To compensate for this, the measurements must be averaged over time. If the measurements are averaged over a short period of time, a false positive reading could occur if several low readings from the accelerometer are coincidentally taken in a row. If the measurements are averaged over a long period of time, the system may not respond quickly enough to give the driver adequate time to stabilize the vehicle.

Finally, the readings from an accelerometer will vary depending upon the weight of the vehicle, the air temperature surrounding the accelerometer, and other factors. As discussed above, the readings from the accelerometer are compared to a threshold value to determine whether a roll-over is occurring. However, in order for the system to work, the threshold value would have to be altered as the payload of the vehicle changed, as the outside temperature changed, and as any other relevant factor changed.

SUMMARY OF THE INVENTION

The present invention is directed to a method for detecting a roll-over condition of a vehicle by analyzing forces acting on the vehicle. The method comprises providing a first accelerometer on the vehicle at a first location along the length of the vehicle, providing a second accelerometer on the vehicle at a second location along the length of the vehicle, and receiving data from the first and second accelerometers regarding the forces acting on the vehicle. The method also includes comparing the data from the first and second accelerometers and actuating at least one safety device if the differences between the data meet at least one predetermined criterion.

In another important feature of the invention, the safety device is actuated if the difference between the standard deviation of the data from the first accelerometer and the standard deviation of the data from the second accelerometer exceeds a predetermined value. In another feature of the invention, data is received and analyzed from a third accelerometer to account for the effect of road conditions on the differences in the data received from the first and second accelerometers.

In another important feature of the invention, an apparatus is provided for detecting a roll-over condition of a vehicle by analyzing forces acting on the vehicle. The apparatus includes a first accelerometer adapted to be mounted on the vehicle at a first location along the length of the vehicle, a second accelerometer adapted to be mounted on the vehicle at a second location along the length of the vehicle, and a controller configured to receive data from the first and second accelerometers regarding the forces acting on the vehicle and to compare the data and actuate at least one safety device if the differences between the data meet at least one predetermined criterion.

These and other features of the present invention can be best understood from the following specification and drawings. The following is a brief description of the drawings in this application.

DETAILED DESCRIPTION OF THE PREFERRED EMBODIMENT

Figure 1:
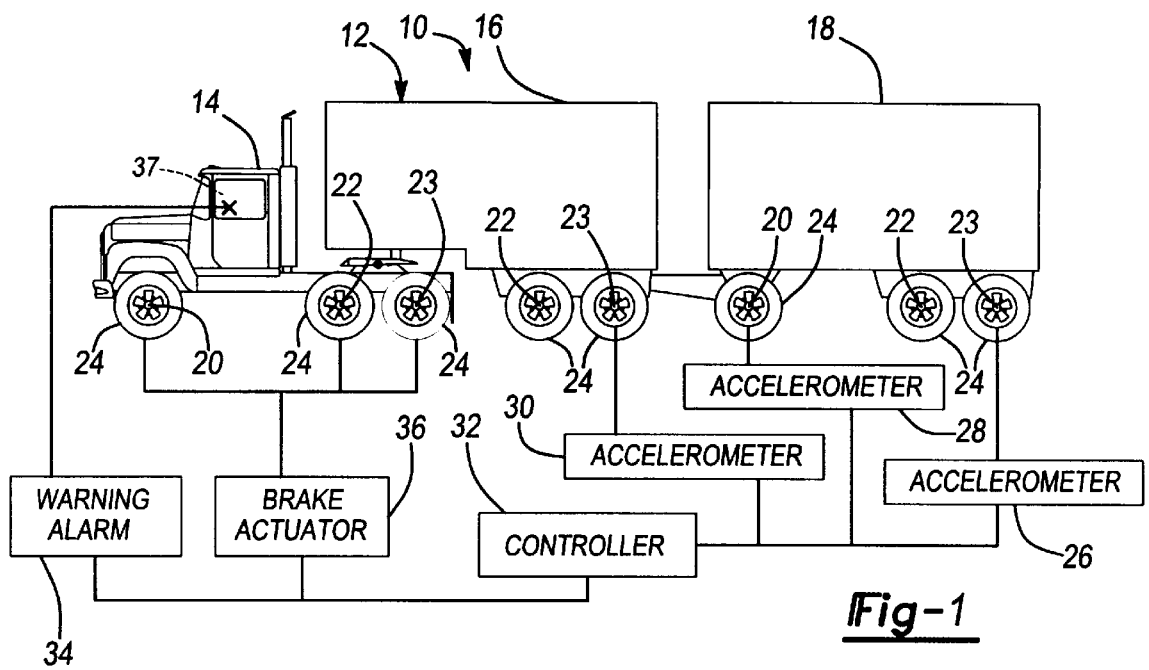
FIG. 1 is a side view of a vehicle including accelerometers mounted at various locations along the length of the vehicle.

The present invention is generally shown at 10 in FIG. 1 and includes a vehicle 12 comprising a tractor-trailer of the type used to haul cargo. The vehicle 12 includes a cab 14 at the front of the vehicle 12, a first trailer 16, and a second trailer 18 at the rear of the vehicle 12. The cab 14 and second trailer 18 each include a front axle 20 and two rear axles 22,23. The first trailer only includes two rear axles 22,23. The axles 20,22,23 each rotatably support wheels 24.

As shown in FIG. 1, a first accelerometer 26 is mounted on the rear axle 23 of the second trailer 18 and a second accelerometer 28 is mounted on the front axle 20 of the second trailer 18. A third accelerometer 30 is be mounted on the rear axle 23 of the first trailer 16. The accelerometers 26,28,30 are configured to detect forces in a single direction. In the preferred embodiment, the accelerometers 26,28,30 are oriented to measure gravitational forces in the vertical direction when the vehicle 12 is upright. Any change in the orientation of the vehicle 12, however, will affect the orientation of the accelerometers 26,28,30 and the force measurements therefrom. Specifically, if the vehicle 12 begins to tip, the force measurements from the accelerometers 26,28, 30 will decrease. If the vehicle 12 is at rest and is completely on its side, the accelerometer readings will be zero.

A controller 32 is also shown schematically in FIG. 1 and is operatively associated with the first, second, and third accelerometers 26,28,30 and with two safety devices 34,36 on the vehicle 12. The controller 32 is configured to receive data from the first and second accelerometers 26,28 regarding the forces acting on the vehicle 12 and to actuate the safety devices 34,36 if the differences between the data from the first and second accelerometers 26,28 meet at least one predetermined criterion.

As shown schematically in FIG. 1, the safety devices 34,36 include a warning light/audible alarm 34 positioned within a driver compartment 37 of the cab 14. The safety devices 34,36 also include an automatic brake actuator 36 which engages brakes (not shown) on the wheels 24 to automatically slow the vehicle 12.

The controller 32 is also configured to receive data from the third accelerometer 30 regarding the forces acting on the vehicle 12 and to utilize the data to account for the effect of road conditions on the differences in the data received from the first and second accelerometers 26,28. The operation of the controller 32 and the accelerometers 26,28,30 will be discussed in more detail below.

Figure 2:
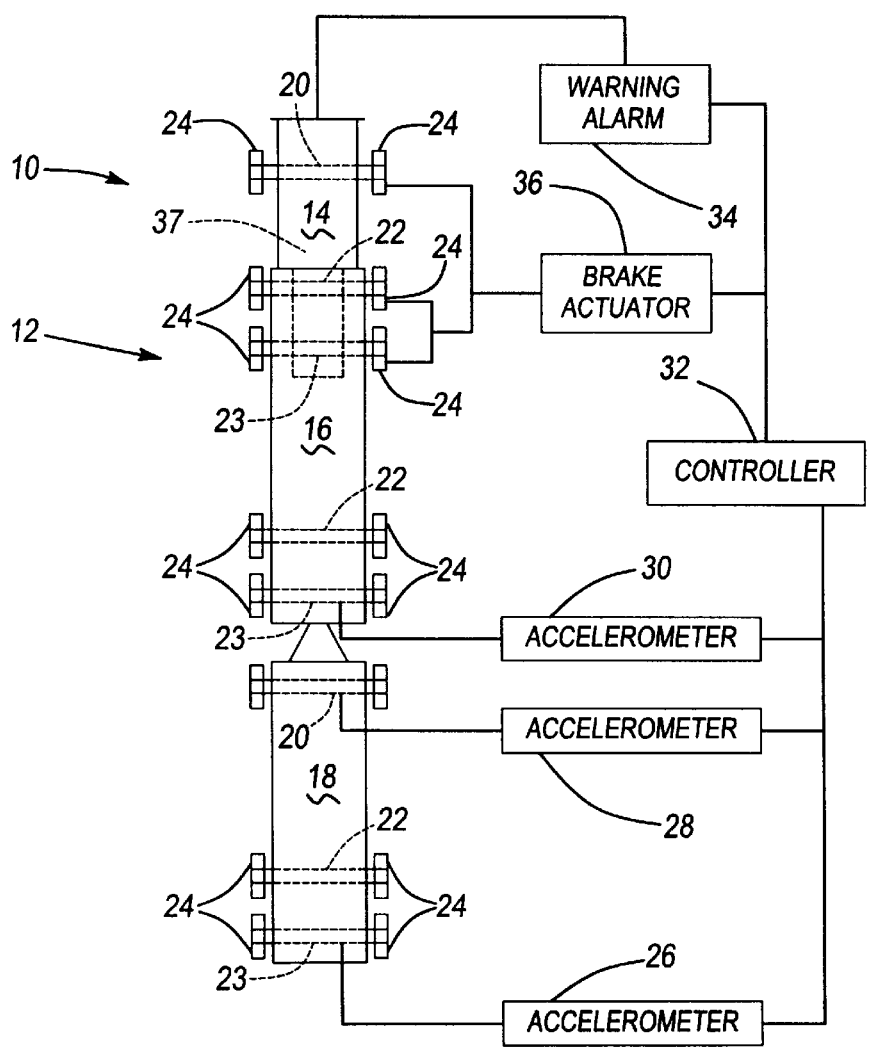
FIG. 2 is a schematic view of the vehicle showing the accelerometers mounted on axles of the vehicle and a controller engaged with the accelerometers.

FIG. 2 is a schematic view of the vehicle 12 which illustrates more clearly he relative positioning of the first, second, and third accelerometers 26,28,30 on the axles 20,22,23 of the vehicle 12. As discussed above, the first accelerometer 26 is on the rear axle 23 of the second trailer 18, the second accelerometer 28 is on the front axle 20 of the second trailer 18, and the third accelerometer 30 is on the rear axle 23 of the first trailer 16. FIG. 2 also schematically illustrates the controller 30, the warning alarm 34, and the automatic brake actuator 36 engaged with the wheels 24 of the vehicle 12.

Figure 3:
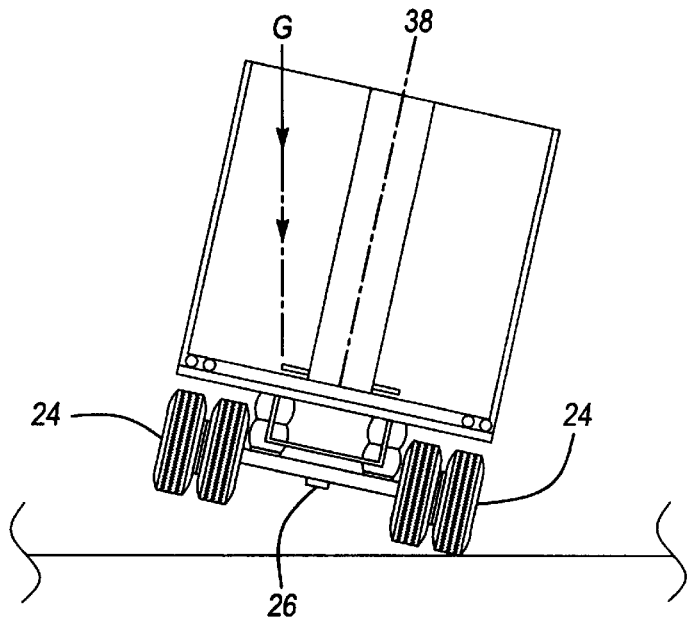
FIG. 3 is a rear view of the vehicle at the beginning of a roll-over condition.

FIG. 3 is a rear view of the vehicle 12 during the beginning of a roll-over condition. The accelerometers 26,28,30 measure forces along line 38. As discussed above, as the vehicle 12 begins to tip the accelerometers 26,28,30 will measure forces at an angle relative to the gravitational forces G. As such, the accelerometers 26,28,30 will only measure a component of the gravitational forces G and will show a decreased force reading as the vehicle 12 continues to tip.

Figure 4:
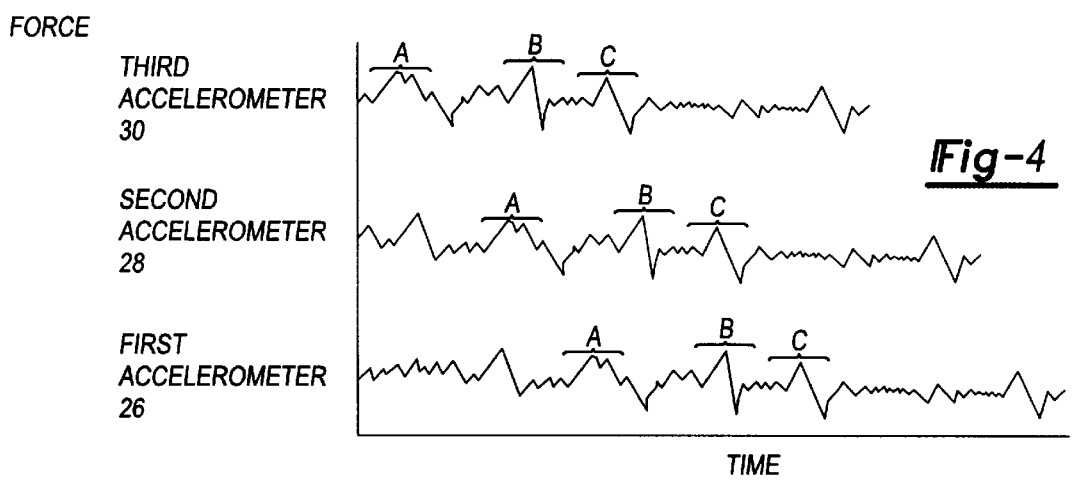
FIG. 4 is a representation of the data received from the accelerometers over time during normal operating conditions.

In operation, the controller 32 detects a roll-over condition by analyzing the data from the accelerometers 26,28,30 in several ways. FIG. 4 illustrates the data received by the accelerometers 26,28,30 under ordinary operating conditions for the vehicle 12. The accelerometers 26,28,30 will provide a force reading which is dependent upon the load of the vehicle 12, the temperature, the sensitivity of the accelerometer, and possibly other factors. As the vehicle 12 moves along a typical road surface, bumps and other imperfections in the road surface will cause the reading to fluctuate as the vehicle vibrates and bounces up and down.

Occasionally, a large bump or pothole will cause a significant change in the accelerometer reading. As shown in FIG. 4, the portions of the graph labeled A, B, and C correspond to the vehicle 12 striking a large bump or hole in the road surface. Because the third accelerometer 30 is positioned closest to the front of the vehicle 12, any bumps or dips in the road surface will first be reflected in the readings from the third accelerometer 30. The fluctuations will then be consecutively shown in the readings from the second and first accelerometers 28,26, as shown in FIG. 4.

Figure 5:
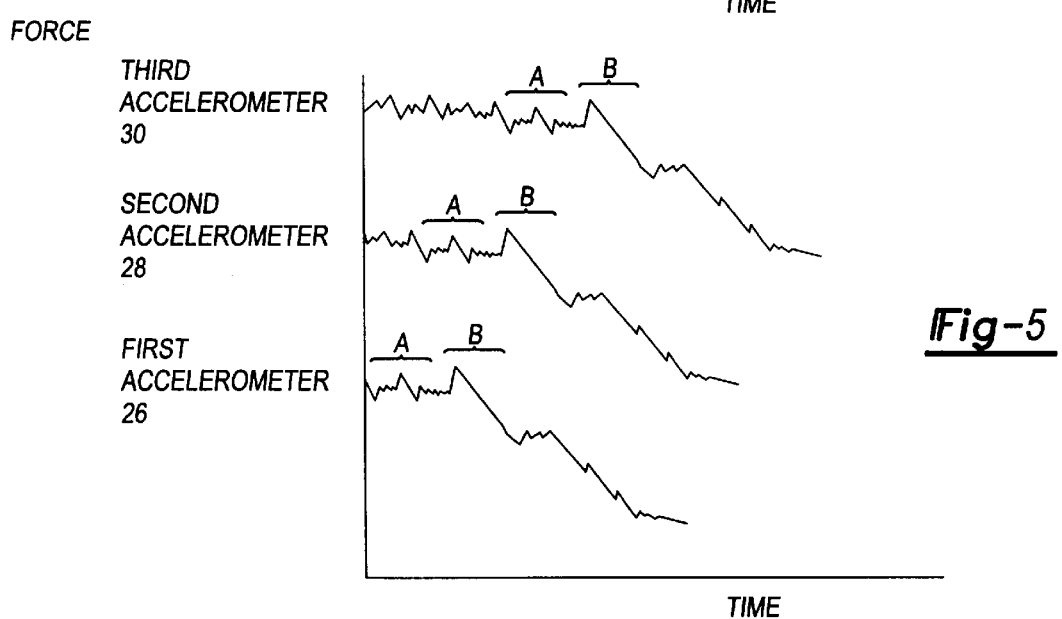
FIG. 5 is a representation of the data received from the accelerometers over time during the start of a roll-over condition.

FIG. 5 illustrates the readings from the three accelerometers 26,28,30 as the vehicle 12 transitions from a normal operating condition to a roll-over condition. The roll-over condition is initially experienced at the rear end of the vehicle 12. This occurs because the rear end of the vehicle 12 experiences the highest lift due to the accelerations produced when the vehicle 12 makes a turn. In effect, the front of the vehicle 12 pulls the rear to force it to change directions. This change causes the lift effect. Thus, the changes in the accelerometer readings will first be experienced by the first accelerometer 26 and then progress to the second accelerometer 28 and, ultimately, the third accelerometer 30 as the roll-over condition of the vehicle 12 continues to develop.

As shown in FIG. 5, the vehicle has an initial period of normal operation indicated at A. At point B, however, the vehicle 12 begins to roll over and the readings from the accelerometers 26,28,30 undergo two noticeable changes. First of all, because the accelerometers 26,28,30 are no longer completely vertically oriented, the magnitude of the gravitational force measurements will decrease. Further, there is a decrease m the fluctuation of the readings from the accelerometers 26,28,30 because one of the wheels 24 is no longer contacting the road surface (or has less contact therewith). As such, the vibrations caused by contact between that wheel 24 and the road surface are reduced or eliminated, resulting in fewer vibrations passed along to the accelerometers 26,28,30.

To determine whether the roll-over condition is occurring, the controller 32 compares the data from the first accelerometer 26 with the data from the second accelerometer 28 to verify that there is a significant difference in magnitude of the readings from the first and second accelerometers 26,28. If the difference is significant enough to exceed a predetermined threshold value, the controller 32 will determine that the rear of the vehicle 12 is beginning to tip compared to the front of the vehicle 12, a clear sign that a roll-over is occurring. The controller 12 would then actuate the warning alarm 34, the automatic brake actuator 36, or another safety device.

Because the three accelerometers 26,28,30 are at various locations along the length of the vehicle 12, it is possible that a difference in the magnitude of the readings will be caused by road conditions and not by a roll-over condition. In other words, if the wheels 24 at the rear axle 23 of the second trailer 18 are entering a large dip in the road, the first accelerometer 26 will provide a lower reading than the second accelerometer 28. Similarly, if the wheels 24 at the front axle 20 of the second trailer 18 are striking a large bump, the second accelerometer 28 will provide a higher reading than the first accelerometer 26. One way to account for this is to increase the threshold value for detecting a roll-over condition to a high enough value to screen out false positive readings caused by road conditions.

Another solution is to wait to activate the safety devices 34,36 until the threshold value has been exceeded for a predetermined period of time. During a roll-over condition, variations in the accelerometer readings will persist over time, whereas variations in the readings caused by road conditions will not.

In the preferred embodiment, readings from the third accelerometer 30 can be used to develop a "signature" for the road surface and allow the controller 32 to account for the effect of the road surface on the measurements received from the first and second accelerometers 26,28. Specifically, the controller 32 can compare the readings from the second and third accelerometers 28,30 and note any large differences in the values caused by fluctuations in the road surface. The controller 32 can then utilize this information to negate any false positive readings that may occur when comparing the readings from the first and second accelerometers 26,28.

For example, if a dip in the road surface causes a temporary drop in the force readings from the third accelerometer 30, and this drop is subsequently experienced in the readings from the second accelerometer 28, the controller 32 can anticipate a sudden drop in the readings from the first accelerometer 26. The controller 32 would then suppress a false positive reading that may otherwise result because the readings from the first accelerometer 26 will be lower than those from the second accelerometer 28.

A "signature" can also be identified by analyzing the energy spectrum from a particular accelerometer (such as the third accelerometer 30) and using this to predict the readings from the second and first accelerometers 28,26 to negate any false positive readings. For example, the readings from the third accelerometer 30 can be taken at 100 Hertz wherein every ten readings are averaged to produce ten averages per second (of ten data points each). Each data point can be taken relative to a reference value and assigned a value of zero (if the data point is below the reference value) or one (if the data point is above the reference value). The resulting signature provided by the third accelerometer 30 can be used to predict and account for the effect of road conditions on the ability to detect a roll-over. Other types of analyses can be conducted on the data from the accelerometers 26,28,30 such as a fast fourier transform, a wavelet transform, or other analysis to develop a signature representative of the road conditions affecting the accelerometer readings. The controller 32 also looks for any sudden decrease in the fluctuation of the readings from the first accelerometer 26 to detect the beginning of a roll-over condition. As discussed above, a decrease in the fluctuation could be caused by decreased contact between a wheel 24 on the rear axle 23 of the second trailer 18 as the vehicle is beginning to tip over. Preferably, the controller 32 calculates the standard deviation of the readings from all three accelerometers 26,28,30. The controller 32 actuates the safety devices 34,36 if the standard deviation of the readings from the first accelerometer 26 differs from the standard deviation of the readings from the second accelerometer 28 (or third accelerometer 30) by a predetermined value.

Again, it is possible that road conditions could create a false positive reading that a roll-over is occurring. For example, the readings from the first accelerometer 26 would be more steady than those from the second accelerometer 28 if, for a brief instant of time, the wheels 24 on the rear axle 23 of the second trailer 18 are on a smooth surface but the wheels 24 on the front axle 20 of the second trailer 18 have progressed to a rough surface. To account for this factor, the readings from the third accelerometer 30 can again be utilized to determine a road signature to suppress a false positive reading.

For example, if the readings from all three accelerometers 26,28,30 were experiencing a normal degree of fluctuation, and then the fluctuation of the readings from the third accelerometer 30 significantly increases, the controller 32 could anticipate a sudden increase in the fluctuation of the readings from the second accelerometer 28. Thus, even though over a very short period of time the fluctuation in the readings from the second accelerometer 28 will be greater than those for the first accelerometer 26, the controller 32 will be able to determine that this difference is due to road conditions and is not caused by the beginning of a rollover.

An analysis of the vehicle wheel speed can also be used in conjunction with the accelerometer readings to detect a roll-over condition. The vehicle wheel speed is measured in vehicles with anti-lock brakes and could be readily available for this purpose. For example, as the vehicle 12 begins to tip, the wheels 24 on one side of the vehicle 12 will slow down as they lose contact with the road surface. The controller 32 can compare the vehicle wheel speeds on each side of the vehicle 12, particularly for the rear-most wheels 24, to determine whether there is a significant difference in wheel speed. If a difference is detected, the warning alarm 34 and/or brake actuator 36 can be activated to prevent the roll-over condition. This could be used either independently of the accelerometer measurements or as a double-check of the accelerometer measurements. Wheel speed detectors 40 are shown FIGS. 1 and 2 mounted to both of the wheels 24 on the rear most axle 23 of the vehicle 12. The wheel speed detectors 40 are operably associated with the controller 32.

Although it is preferable that the various analyses of the accelerometer data operate together to provide the most accurate detection of a roll-over condition, it is not essential that each be provided in a roll-over detection system and method of the present invention. For example, only two accelerometers 26,28 can be provided without using a third accelerometer 30 to provide a road signature. In this case, the controller 32 would make other adjustments as discussed above to detect false positive readings of a roll-over condition.

Other modifications could also be made to the specific method and apparatus discussed above and still fall within the scope of the invention. For example, the accelerometers need not be mounted on the axles 20,22,23 of the vehicle 12 but could, instead, be mounted at spaced locations along the length of the vehicle 12. Further, the present invention could be utilized for vehicles 12 including a cab 14 and only a single trailer 16.

The controls necessary to achieve this invention are well within the skill of a worker in this art, given the foregoing disclosure. It is a special application of a method and apparatus for detecting a roll-over condition of a vehicle which is inventive here.

A preferred embodiment of this invention has been disclosed. However, a person of ordinary skill in the art would recognize that certain modifications come within the scope of this invention. For that reason, the following claims should be studied to determine the true scope and content of the invention.

What is claimed is:

1. A method for detecting a roll-over condition of a vehicle by analyzing forces acting on the vehicle, said method comprising the steps of:

providing a first accelerometer on a first axle of the vehicle;

providing a second accelerometer on a second axle of the vehicle;

receiving data from the first accelerometer regarding the forces acting on the vehicle;

receiving data from the second accelerometer regarding the forces acting on the vehicle;

comparing the data received from the first accelerometer and the data received from the second accelerometer; and actuating at least one safety device if the differences between the data from the first and second accelerometers meet at least one predetermined criterion.

2. The method defined in claim 1 wherein said actuating step includes actuating either a warning light, an audible alarm, or an automatic brake actuator.

3. The method defined in claim 1 further comprising:
comparing the magnitude of the data received from the first accelerometer and the second accelerometer; and
actuating the safety device if the difference in magnitude between the data from the first and second accelerometers exceeds a predetermined value.

4. The method defined in claim 1 wherein a third accelerometer is mounted on the vehicle, and said method further comprises the steps of:
receiving data from the third accelerometer regarding the forces acting on the vehicle; and
utilizing the data from the third accelerometer to account for the effect of road conditions on the differences in the data received from the first accelerometer and the data received from the second accelerometer.

5. The method defined in claim 1 further comprising:
comparing the speed of a first vehicle wheel with the speed of a second vehicle wheel; and
actuating the safety device if the differences between the speeds of the first and second vehicle wheel exceed a predetermined criterion.

6. The method defined in claim 5 wherein the first vehicle wheel is on a first side of the vehicle and the second vehicle wheel is on a second side of the vehicle.

7. A method for detecting a roll-over condition of a vehicle by analyzing forces acting on the vehicle, said method comprising the steps of:
providing a first accelerometer on the vehicle at a first location along the length of the vehicle;
providing a second accelerometer on the vehicle at a second location along the length of the vehicle;
receiving data from the first accelerometer regarding the forces acting on the vehicle;
receiving data from the second accelerometer regarding the forces acting on the vehicle;
comparing the standard deviation of the data received from the first accelerometer with the standard deviation of the data received from the second accelerometer; and
actuating at least one safety device if the standard deviation of the data received from the first accelerometer differs from the standard deviation of the data received by the second accelerometer by an amount exceeding a predetermined value.

8. An apparatus for detecting a roll-over condition of a vehicle by analyzing forces acting on the vehicle, said apparatus comprising:
a first accelerometer adapted to be mounted on the vehicle on a first axle;
a second accelerometer adapted to be mounted on the vehicle on a second axle; and
a controller configured to receive data from said first and said second accelerometers regarding the forces acting on the vehicle, compare the data received from said first and said second accelerometers, and actuate at least one safety device if the differences between the data from the first accelerometer and the second accelerometer meet at least one predetermined criterion.

9. The apparatus of claim 8 wherein said controller is configured to compare the magnitude of the data received from said first accelerometer and said second accelerometer and actuate the safety device if the difference in magnitude between the data from said first and said second accelerometers exceeds a predetermined value.

10. The apparatus of claim 8 wherein:
a third accelerometer is mounted on the vehicle; and
said controller is configured to receive data from said third accelerometer regarding the forces acting on the vehicle and utilize the data from the third accelerometer to account for the effect of road conditions on the differences in the data received from the first accelerometer and the data received from the second accelerometer.

11. The apparatus of claim 10 including a third accelerometer and wherein the vehicle includes a front with said third accelerometer being adapted to detect forces closer to said front of the vehicle than said first or said second accelerometer.

12. An apparatus for detecting a roll-over condition of a vehicle by analyzing forces acting on the vehicle, said apparatus comprising:
a first accelerometer adapted to be mounted on the vehicle at a first location along the length of the vehicle;
a second accelerometer adapted to be mounted on the vehicle at a second location along the length of the vehicle; and
a controller configured to receive data from said first and said second accelerometers regarding the forces acting on the vehicle, compare the standard deviation of the data received from said first accelerometer with the standard deviation of the data received from said second accelerometer and actuate at least one safety device if the standard deviation of the data received from said first accelerometer differs from the standard deviation of the data received by said second accelerometer by an amount exceeding a predetermined value.

13. A method for detecting a roll-over condition of a vehicle by analyzing the operating characteristics of the vehicle, said method comprising the steps of:
providing a first accelerometer on a first axle of the vehicle;
providing a second accelerometer on a second axle of the vehicle;
receiving data from the first accelerometer regarding the forces acting on the vehicle;
receiving data from the second accelerometer regarding the forces acting on the vehicle;
comparing the data received from the first accelerometer and the data received from the second accelerometer to detect roll-over;
measuring the speed of a first wheel on the vehicle;
measuring the speed of a second wheel on the vehicle;
comparing the speed of the first wheel with the speed of the second wheel to verify roll-over; and
actuating at least one safety device if the difference between the speed of the first and second wheels meets at least one predetermined criterion.

14. The method defined in claim 13 wherein the first wheel is supported on an axle on a first side of the vehicle and the second wheel is supported on the same axle on a second side of the vehicle.

* * * * *